(12) United States Patent
Fenny et al.

(10) Patent No.: US 6,220,545 B1
(45) Date of Patent: Apr. 24, 2001

(54) METHOD AND APPARATUS FOR SENSING PRELOAD IN A TILT ROTOR DOWNSTOP

(75) Inventors: Carlos Alexander Fenny, Arlington; Paul Eugene Darden, Dalworthington Gardens; Kenneth Eugene Builta, Euless, all of TX (US)

(73) Assignee: Bell Helicopter Textron Inc., Hurst, TX (US)

( * ) Notice: Subject to any disclaimer, the term of this patent is extended or adjusted under 35 U.S.C. 154(b) by 0 days.

(21) Appl. No.: 09/369,820

(22) Filed: Aug. 6, 1999

(51) Int. Cl.$^7$ .................................................. B64C 15/00
(52) U.S. Cl. .................. 244/7 R; 244/75 R; 73/862.542
(58) Field of Search .................................... 244/7 R, 7 A, 244/7 B, 7 C, 75 R; 73/862.541, 862.542; 91/512, 447; 702/41–44; 318/566; 60/436, 441, 442

(56) References Cited

U.S. PATENT DOCUMENTS

| | | | |
|---|---|---|---|
| 3,628,394 | 12/1971 | Keatinge et al. | 74/471 XY |
| 3,832,895 | 9/1974 | Strandh | 73/133 R |
| 4,891,942 | * 1/1990 | Schwarz | 60/436 |
| 5,092,539 | * 3/1992 | Caero | 244/75 R |
| 5,128,671 | 7/1992 | Thomas, Jr. | 341/20 |
| 5,440,499 | * 8/1995 | Rasmussen | 73/862.542 |
| 5,686,672 | * 11/1997 | Klauber et al. | 73/862.191 |
| 5,705,757 | * 1/1998 | Wozniak | 73/862.338 |
| 5,868,351 | * 2/1999 | Stamps et al. | 244/75 R |

FOREIGN PATENT DOCUMENTS

| | | | |
|---|---|---|---|
| 2093191 | 8/1982 | (GB) | G01L/5/13 |
| 2238404 | 5/1991 | (GB) | B66B/7/02 |
| 10-119100 | 5/1998 | (JP) | B29C/45/66 |

* cited by examiner

Primary Examiner—Galen L. Barefoot
(74) Attorney, Agent, or Firm—Melvin A. Hunn; James E. Walton

(57) ABSTRACT

A improved tilt rotor aircraft comprising an airframe, at least one wing member coupled to the airframe, and at least one tilt rotor assembly carried by the at least one wing member. The tilt rotor assembly is actuated by a conversion actuator. The improved tilt rotor aircraft includes a low-height tunable downstop assembly for absorbing oscillatory vibration loads, such as pitch loads and yaw loads. The low-height tunable downstop assembly comprises a pivotable striker assembly having an adjustable stiffness, and a cradle assembly adapted to releasably receive the striker assembly. The striker assembly is attached to the tilt rotor assembly and the cradle assembly is attached to the wing member. A plurality of sensor modules are bonded to the cradle assembly. The sensor modules include a plurality of strain gages arranged to sense shear strain in the cradle assembly. The sensor modules are electrically coupled to sensor circuits and flight control computers. As the conversion actuator pivots the tilt rotor assembly into the airplane mode, the conversion actuator forces the striker assembly into contact with the cradle assembly at a selected preload. The sensor modules directly sense preload induced strain in the cradle assembly and send corresponding signals to the flight control computers via the sensor circuits. If the signals from the sensor modules indicate that the preload is insufficient to maintain stability in the aircraft mode, then a warning signal is sent to the pilot and a control signal is sent to the conversion actuator to increase the preload. Likewise, if the signals from the sensor modules indicate that the preload is too high, a warning signal is sent to the pilot and a control signal is sent to the conversion actuator to decrease the preload.

19 Claims, 14 Drawing Sheets

BLOCK DIAGRAM - STRAIN GAGE SENSOR MODULE

BLOCK DIAGRAM - STRAIN GAGE SENSOR MODULE

SAMPLE STRAIN GAGE SIGNAL CONDITIONING CIRCUIT

METHOD AND APPARATUS FOR SENSING PRELOAD IN A TILT ROTOR DOWNSTOP

BACKGROUND ART

1. Field of the Invention

The present invention relates generally to conversion assemblies for use on tilt rotor aircraft for converting from a helicopter mode to an airplane mode, and vice versa. In particular, the present invention relates to a method and apparatus for sensing the preload between a tilt rotor assembly and a wing when the tilt rotor aircraft is in the airplane mode.

2. Description of Related Art

Tilt rotor aircraft are hybrids between traditional helicopters and traditional propeller driven aircraft. Typical tilt rotor aircraft have fixed wings that terminate with convertible tilt rotor assemblies that house the engines and transmissions that drive the rotors. Tilt rotor aircraft are convertible from a helicopter mode, in which the tilt rotor aircraft can take-off, hover, and land like a helicopter; to an airplane mode, in which the tilt rotor aircraft can fly forward like a fixed-wing aircraft.

As one might expect, aside from the usual problems that must be addressed when designing either helicopters or propeller driven aircraft, the design of tilt rotor aircraft poses unique problems not associated with either helicopters or propeller driven aircraft. In particular, because the wings of tilt rotor aircraft must be designed to function in both the helicopter mode and the airplane mode, traditional design criteria used for helicopters or propeller driven aircraft alone are not sufficient. For example, the wings of tilt rotor aircraft often accommodate and support fuel tanks, interconnecting drive shafts from one engine to the other, interconnecting drive shafts from one conversion actuator to the other, redundant drive shafts, and spindles about which the tilt rotor assemblies and conversion actuators pivot. For these reasons, the space within the wings is extremely limited, resulting in little or no room for intrusive devices, measuring devices, sensing devices, or additional structural supports. Nevertheless, certain loads, both static and dynamic, must be carried by the wings of tilt rotor aircraft that are not present in either helicopters or fixed wing aircraft.

In a typical tilt rotor aircraft, the interconnecting drive shafts from one engine to the other are located near the trailing edges of the wings, as are the main spindles about which the tilt rotor assemblies pivot. Hydraulic conversion actuators for actuating the tilt rotor assemblies are pivotally carried at the wing tips and, in some instances, interconnected by shafts that run along the leading edges of the wings. This arrangement does not create problems when the tilt rotor aircraft is operating in the helicopter mode; but when the tilt rotor aircraft converts to the airplane mode, certain oscillatory vibration loads, such as longitudinal pitch loads and lateral yaw loads, are created by the rotors. Because of these unique airplane-mode loads, if a minimal structural stiffness is not maintained between the tilt rotor assembly and the wing, then the aircraft will become unstable. This minimal structural stiffness is based upon airplane-mode aircraft speed and related load factors. The internal preload of the conversion actuator increases the effective pitch stiffness of the tilt rotor assembly, but has little or no effect on the yaw stiffness of the tilt rotor assembly. To improve yaw stiffness, downstop assemblies with interlocking yaw restraints are used. However, the interlocking yaw restraints are only safe and effective if the tilt rotor assembly is forced against the wing so as to generate a preload sufficient to satisfy static and dynamic load requirements.

Certain attempts have been made to measure and maintain a selected preload between the tilt rotor assembly and the wing while the tilt rotor aircraft is in the airplane mode, but none have adequately resolved the problem. For example, in some tilt rotor aircraft, the preload between the tilt rotor assembly and the wing is measured using a complex closed loop algorithm that uses conversion actuator motor pressure to determine the preload between the tilt rotor assembly and the wing. In these applications, the preload between the tilt rotor assembly and the wing can be set, but with only limited accuracy. In other tilt rotor assemblies, an open loop system is employed in which the conversion actuators simply force the tilt rotor assembly into contact with the wing until the conversion actuator stalls. Such systems are undesirable in certain applications because allowing the preload to go to high requires added structural support resulting in increased weight and cost. In addition, these prior-art systems do not adequately compensate for the dynamic loads generated when the tilt rotor aircraft pulls up or goes into a dive.

Although great strides have been made in the design of tilt rotor aircraft, the problem of sensing and measuring the preload between a tilt rotor downstop assembly and a wing has not been adequately resolved.

BRIEF SUMMARY OF THE INVENTION

There is a need for a tilt rotor aircraft having a tilt rotor downstop assembly for which the preload between the tilt rotor assembly and the wing is measured and controlled directly.

It is an object of the present invention to provide a tilt rotor downstop assembly for which the preload between the tilt rotor assembly and the wing is measured and controlled directly.

It is another object of the present invention to provide a tilt rotor downstop assembly for which the preload between the tilt rotor assembly and the wing is measured directly by using sensor modules comprised of a plurality of strain gages.

It is yet another object of the present invention to provide a tilt rotor downstop assembly for which the preload between the tilt rotor assembly and the wing is sensed and controlled by measuring both static and dynamic loads during flight.

The above objects are obtained by using a tilt rotor downstop assembly having a striker assembly coupled to the tilt rotor assembly and a cradle assembly coupled to the wing. A plurality of sensor modules comprised of an arrangement of strain gages are coupled to the cradle assembly to directly sense the preload between the tilt rotor assembly and the wing by measuring the preload induced strain of the cradle assembly.

The present invention has many advantages over the prior art. The present invention is cost efficient because the size and capacity of the conversion actuator is better matched to the application. Structural weight is saved by not allowing the conversion actuator to generate a preload that is unnecessarily high. In addition, the sensor modules provide a unique and efficient way of directly sensing a load on an aircraft.

The above, as well as, additional objectives, features, and advantages of the present invention will become apparent in the following detailed description when read in conjunction with the accompanying drawings.

DETAILED DESCRIPTION OF THE PREFERRED EMBODIMENT

Figure 1A:
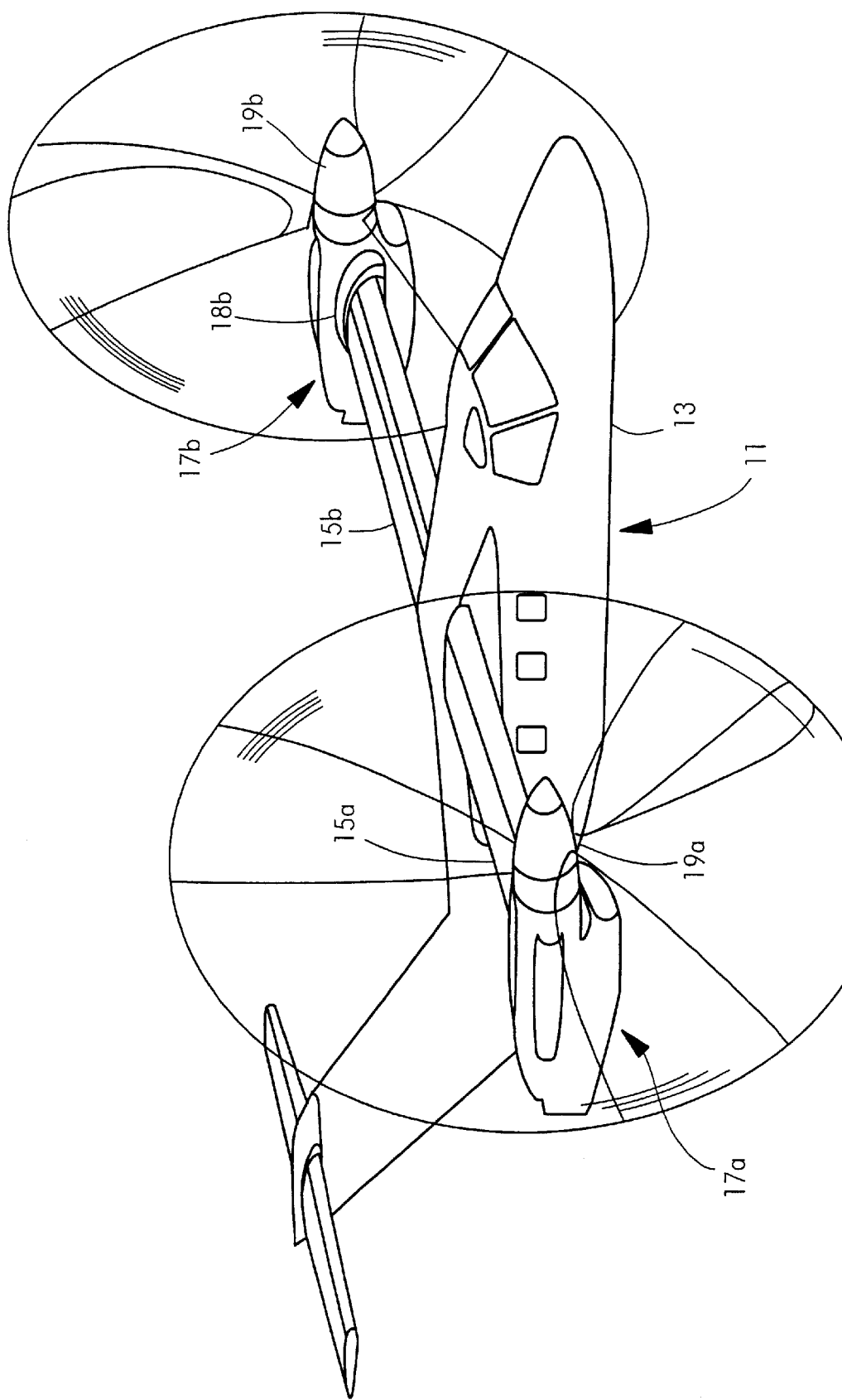
FIG. 1A is a perspective view of a tilt rotor aircraft in an airplane mode.
Figure 1B:
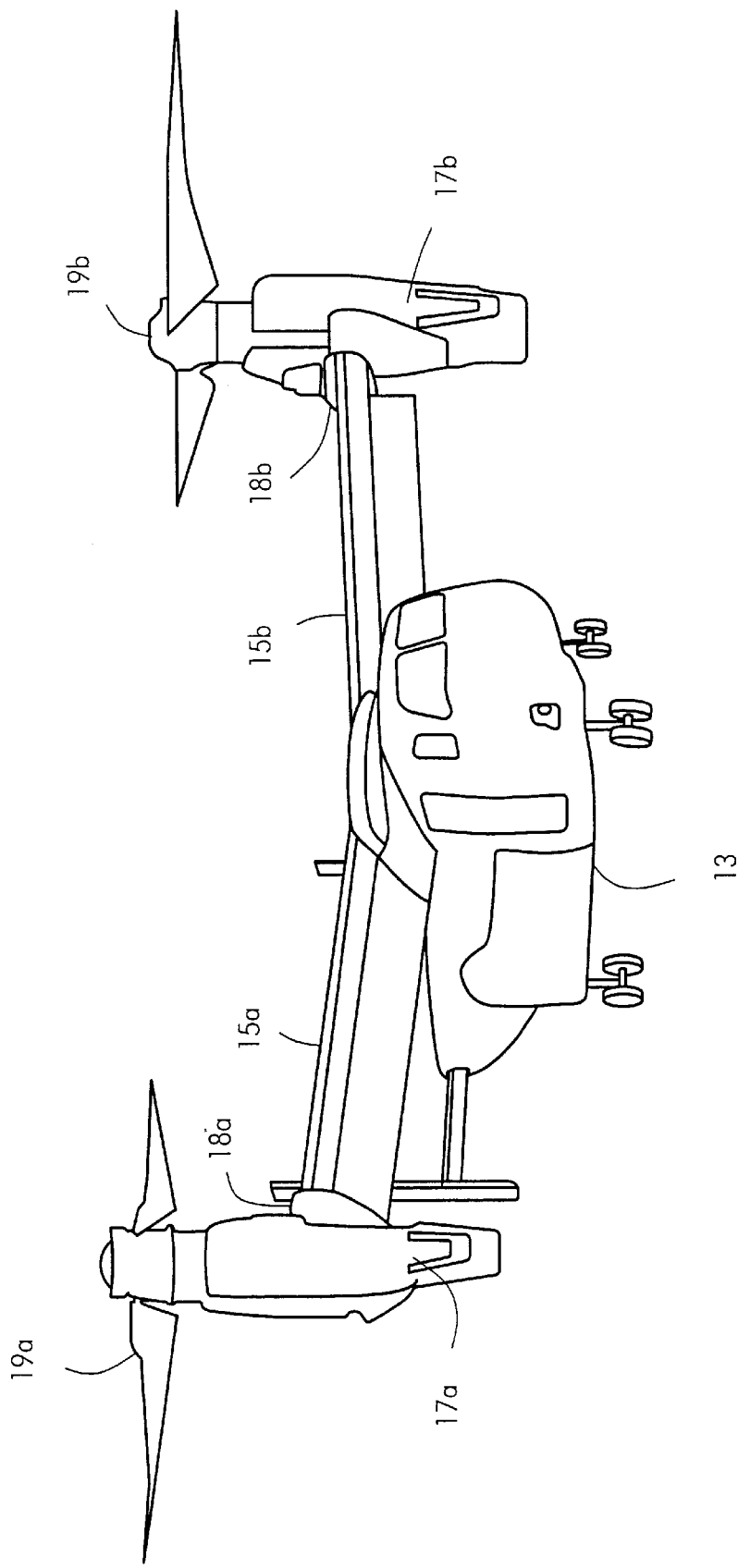
FIG. 1B is a perspective view of a tilt rotor aircraft in a helicopter mode.

Referring to FIGS. 1A and 1B in the drawings, a typical tilt rotor aircraft 11 is illustrated. Tilt rotor aircraft 11 has an airframe 13 and wings 15a and 15b coupled to airframe 13. As is conventional, wings 15a and 15b terminate with tilt rotor assemblies 17a and 17b, respectively. Fairings 18a and 18b for reducing drag are disposed between tilt rotor assemblies 17a and 17b and wings 15a and 15b. Tilt rotor assemblies 17a and 17b each generally include an engine, a transmission and gear box (see FIG. 5) for driving prop-rotors 19a and 19b, and a conversion actuator (see FIGS. 8A and 8B) for actuating tilt rotor assemblies 17a and 17b between an airplane mode, as illustrated in FIG. 1A, and a helicopter mode, as illustrated in FIG. 1B. In the airplane mode, tilt rotor aircraft 11 can be flown and operated like a conventional fixed-wing propeller driven aircraft. In the helicopter mode, tilt rotor aircraft 11 can take-off, hover, land, and be operated like a conventional rotary wing aircraft or helicopter.

Figure 2A:
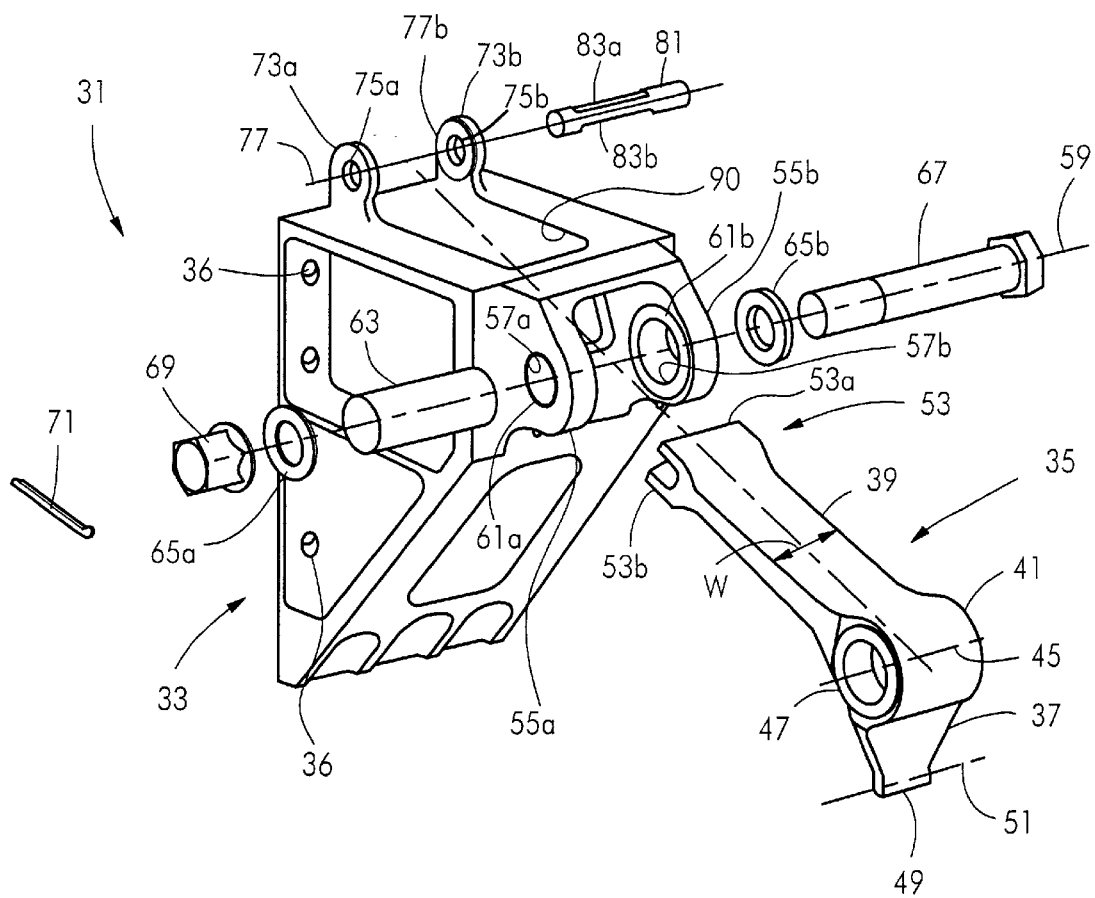
FIG. 2A is an exploded perspective view of a striker assembly of a tilt rotor downstop assembly according to the present invention.
Figure 2B:
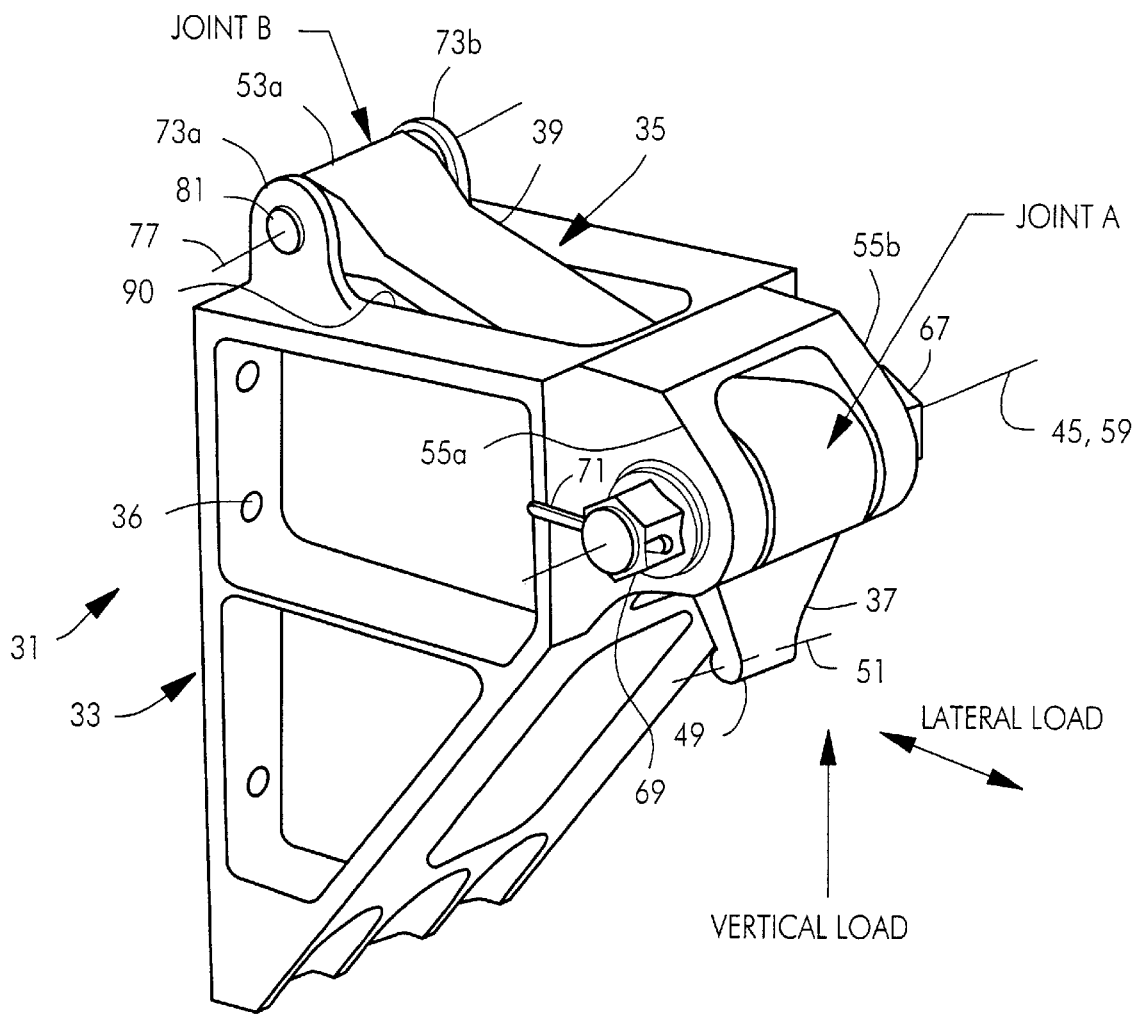
FIG. 2B is an assembled perspective view of the striker assembly of FIG. 2A.

Referring now to FIGS. 2A and 2B in the drawings, the preferred embodiment of a low-height tunable tilt rotor downstop assembly according to the present invention is illustrated. A striker assembly 31 includes a base member 33 configured to pivotally and slidingly receive an angled, tunable striker arm 35. Base member 33 is preferably made of aluminum, but may be made of any other sufficiently rigid material. Base member 33 includes a plurality of mounting apertures 36. Striker arm 35 is generally L-shaped having a post portion 37 and an leg portion 39. Striker arm 35 is preferably made of titanium, but may be made of other materials for which the mechanical properties, in particular bending stiffness, may be adjusted, or "tuned," by altering the geometrical dimensions of striker arm 35. This tuning feature of striker arm 35 will be discussed in more detail below.

Post portion 37 and leg portion 39 of striker arm 35 intersect at a generally cylindrical corner portion 41. Corner portion 41 includes a cylindrical channel 43 that passes transversely through corner portion 41 along an axis 45. Bushings 47 are coupled to the interior of channel 43 on each end of channel 43. Bushings 47 are preferably anti-friction bushings, such as bushings having a teflon lining. Bushings 47 are preferably press fitted into channel 43, but may be coupled to channel by other well known means. Leg portion 39 has a transverse width w that is generally constant over the length of leg portion 39. Post portion 37 preferably tapers inwardly from corner portion 41 to a tip portion 49. Tip portion 49 preferably has a slightly enlarged rounded profile. Thus, tip portion 49 is generally cylindrical along an axis 51. Leg portion 39 extends away from corner portion 41 and terminates at a forked end 53 having an upper fork 53a and a generally parallel lower fork 53b. Striker arm 35 will be explained in more detail below with respect to FIG. 3.

Base member 33 includes a plurality of tabs 55a and 55b. Tabs 55a and 55b are generally parallel and extend perpendicularly outward from base member 33. Tabs 55a and 55b include apertures 57a and 57b, respectively, passing therethrough. Apertures 57a and 57b are aligned along an axis 59. Apertures 57a and 57b are lined with bushings 61a and 61b, respectively. Bushings 61a and 61b are similar in construction to bushings 47. Bushings 61a and 61b are preferably anti-friction bushings, such as bushings having a teflon lining. Bushings 61a and 61b are preferably press fitted into apertures 57a and 57b, but may be coupled to tabs 55a and 55b by other well known means.

A slip bushing 63 is received by bushings 61a and 61b. Slip bushing 63 is preferably an anti-friction bushing having a teflon coating. Slip bushing 63 is held in place between tabs 55a and 55b, preferably by retaining washers 65a and 65b. A pivot pin 67 passes along axis 59 through retaining washer 65b, aperture 57b, bushing 61b, channel 43, bushings 47, bushing 61a, aperture 57a, and retaining washer 65a; and is releasably received by a fastener 69 having a fastening pin 71. In this manner, an anti-friction pivot Joint A (see FIG. 2B) is created, about which post portion 37 and leg portion 39 pivot.

Continuing with reference to FIGS. 2A and 2B, base member 33 includes a second plurality of tabs 73a and 73b. Tabs 73a and 73b are generally parallel and extend perpendicularly outward from base member 33. Tabs 73a and 73b include apertures 75a and 75b, respectively, passing therethrough. Apertures 75a and 75b are aligned along an axis 77. Apertures 75a and 75b are lined with bushings 79a and 79b, respectively. Bushings 79a and 79b are similar in construction to bushings 47. Bushings 79a and 79b are preferably anti-friction bushings, such as bushings having a teflon lining. Bushings 79a and 79b are preferably press fitted into apertures 75a and 75b, but may be coupled to tabs 73a and 73b by other well known means.

A retainer pin 81 is received through bushings 79a and 79b. Retainer pin 81 has a pair of flat recessed portions 83a and 83b disposed axially on opposing sides of retainer pin 81. It is preferred that at least recessed portions 83a and 83b of retainer pin 81 are coated with an anti-friction material, such as teflon. Retainer pin 81 is free to rotate within tabs 73a and 73b about axis 77. Flat recessed portions 83a and 83b are configured to slidingly receive forks 53a and 53b, thereby forming a sliding and pivoting Joint B (see FIG. 2B). Because forks 53a and 53b are allowed to slide relative to retainer pin 81, recessed portions 83a and 83b allow leg portion 39 of striker arm 35 to pivot about axis 59. However, leg portion 39 has sufficient stiffness to prevent forks 53a and 53b from translating enough relative to tabs 73a and 73b such that forks 53a and 53b release from retainer pin 81. In other words, the sliding connection of forks 53a and 53b with retainer pin 81 allows striker arm 35 to pivot about axis 59 and pivot pin 67, i.e., Joint A.

As shown in FIG. 2B, striker arm 35 passes from Joint A to Joint B along a slot 90 in base member 33. Slot 90 allows leg portion 39 of striker arm 35 to remain in a generally horizontal position and flex or bend in a vertical plane without restriction. Slot 90 is configured to accommodate variations in the vertical thickness of leg portion 39, as will be explained in more detail below. In addition, slot 90 allows striker assembly 31 to maintain an overall low vertical height or profile. Although the terms "vertical" and "horizontal" are used herein, it should be understood that these terms are used only for ease of explanation and are not intended to be limiting as to the directions in which the present invention functions.

With striker assembly 31 configured and assembled in this manner, oscillatory vibration loads, such as pitch loads and yaw loads, represented by the lateral loads and vertical loads indicated by arrows in FIG. 2B, generated by tilt rotor assemblies 17a and 17b while in the airplane mode are transferred from tip portion 49 of post portion 37 to leg portion 39 and forks 53a and 53b. It should be understood that the lateral loads and vertical loads represented in FIG. 2B include dynamic loads generated during flight, such as when titl rotor aircraft 11 goes into a dive or pulls up abruptly. Because post portion 37 is short, providing the low-height feature of the present invention, post portion 37 does not bend sufficiently to absorb or isolate the vertical and lateral loads. Thus, the vertical and lateral loads are transferred to leg portion 39 by post portion 37. As leg portion 39 bends, the vertical and lateral loads generated by tilt rotor assemblies 17a and 17b are isolated and absorbed, thereby preventing the vertical and lateral loads from being transferred to wings 15a and 15b. Thus, wings 15a and 15b do not require additional structural support to absorb or dampen the oscillatory vibration loads. This provides tremendous savings in terms of weight and cost.

Figure 3:
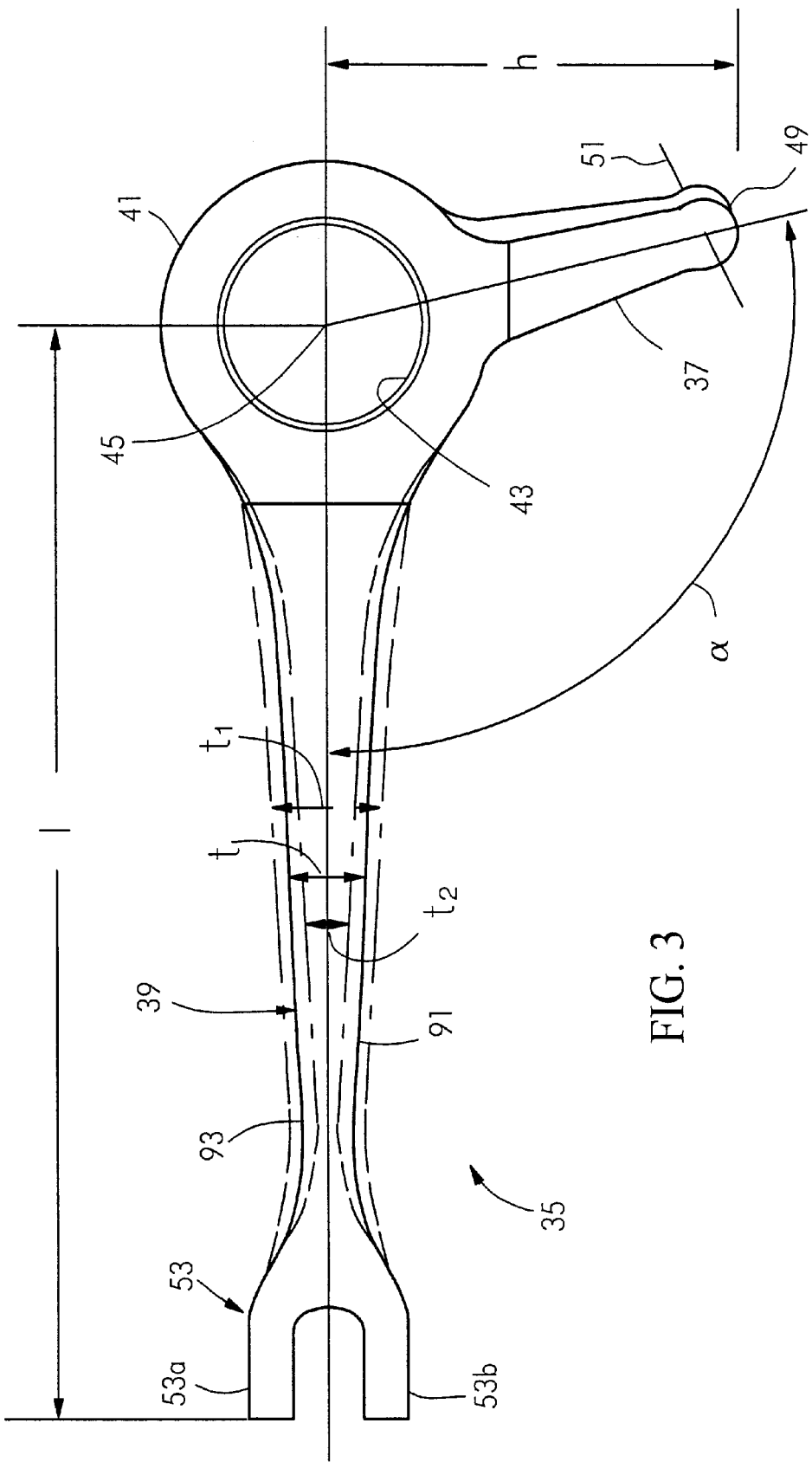
FIG. 3 is a front view of a striker arm of the striker assembly of FIGS. 2A and 2B.

Referring now to FIG. 3 in the drawings, striker arm 35 is illustrated in a front view. As is shown, post member 37 and leg member 39 form an angle α about axis 45. Angle α is preferably about 115° due to the operating angle present between wings 15a and 15b and tilt rotor assemblies 17a and 17b, respectively. Post portion 37 has a vertical height h, as measured from the lowest point of tip portion 49 to axis 45; and leg portion 39 has a length 1, as measured from the end of forks 53a and 53b to axis 45. Due to the low-height feature of the present invention, height h is preferably smaller in magnitude than length 1. It should be noted that axis 45, about which corner portion 41 is concentric, and axis 51, about which tip portion 49 is concentric, are not parallel. This is due to the operating angle between wings 15a and 15b and tilt rotor assemblies 17a and 17b. It should be understood that for certain tilt rotor aircraft, axis 45 and axis 51 may be parallel without significantly affecting the functionality of striker arm 35.

Leg portion 39 has a selected vertical height, or thickness t, as measured from a lower surface 91 to an upper surface 93. It is preferred that thickness t of leg portion 39 taper inwardly from corner portion 41 to forks 53a and 53b, such that leg portion 39 has a selected vertical cross-section, or thickness profile. Although thickness t is illustrated tapering linearly, it should be understood that thickness t may vary non-linearly, such as elliptically, thereby creating a non-linear thickness profile.

It is preferred that striker arm 35 be made of a rigid material, for which the bending stiffness in a vertical plane of leg portion 39 may be selectively varied according to thickness t, the corresponding thickness profile, and length 1. It is preferred that width w of leg portion 39 not have a significant effect on the vertical bending stiffness of leg portion 39. For example, if striker arm 35 is made of titanium, has length 1 of about 7.0 inches, height h of about 2.5 inches, and thickness t varying from about 0.66 inches near corner portion 41 to about 0.38 inches near forks 53a and 53b, then leg portion 39 of has a vertical bending stiffness of about 50,000 pounds per square inch to about 150,000 pounds per square inch.

Because width w of leg portion 39 does not have a significant effect on the vertical bending stiffness of leg portion 39, the vertical bending stiffness of leg portion 39 may be selectively determined by altering length 1 and thickness t of leg portion 39. In other words, striker arm 35 may be tuned to a selective vertical bending stiffness by altering the thickness profile of leg portion 39. It will be apparent that the vertical bending stiffness of leg portion 39 will increase as thickness t increases. Thus, for similar materials, the vertical bending stiffness of leg portion 39 is greater for a thickness profile having a variable thickness $t_1$, than for a thickness profile having a variable thickness t; and the vertical bending stiffness of leg portion 39 is less for a thickness profile having a variable thickness $t_2$, than for a thickness profile having a variable thickness t.

Figure 4:
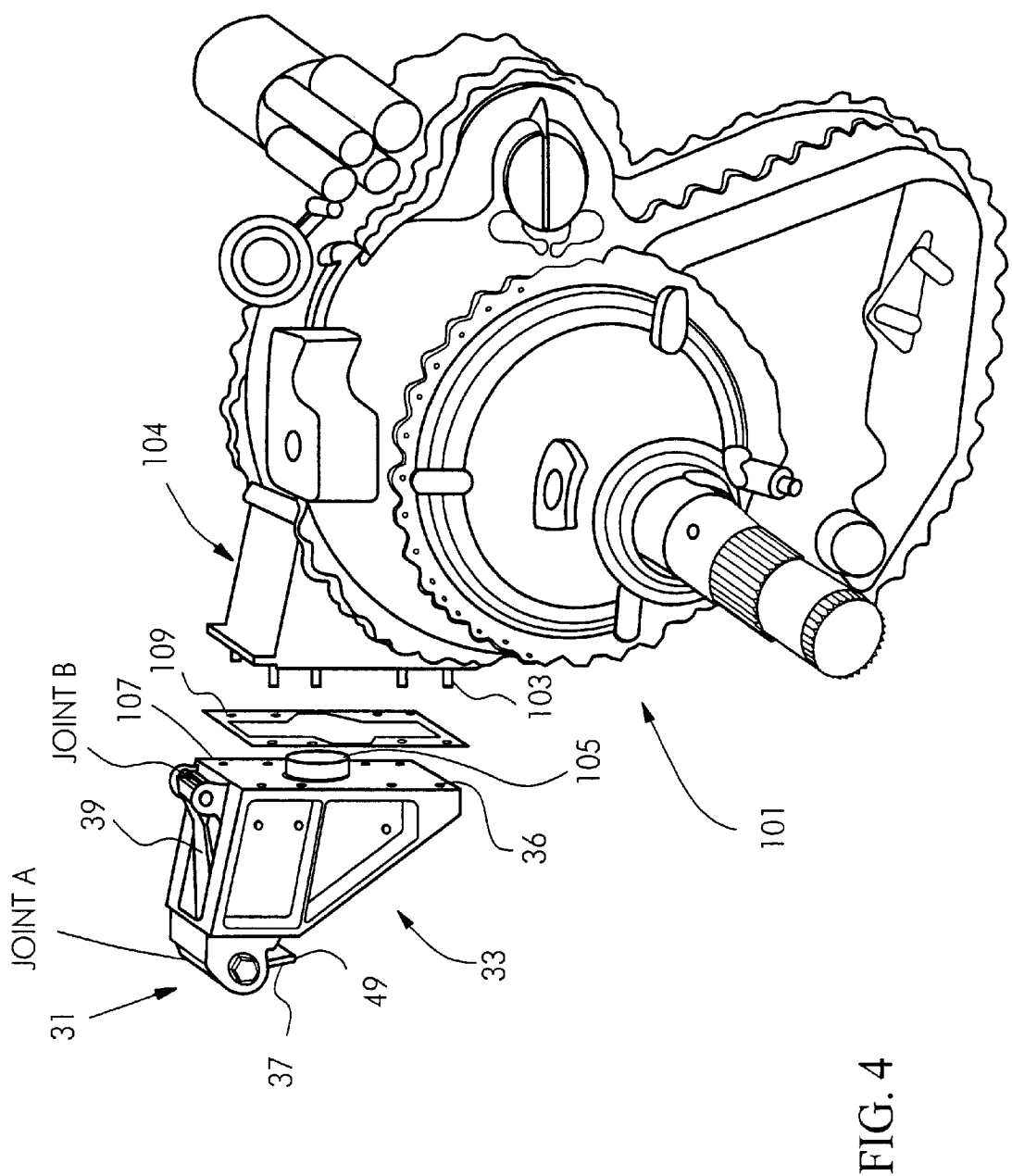
FIG. 4 is an exploded perspective view illustrating the attachment of the striker assembly of FIGS. 2A and 2B to a prop-rotor gear assembly.

Referring now to FIG. 4 in the drawings, assembled striker assembly 31 of FIG. 2B is shown being coupled to a prop-rotor gear assembly 101. Prop-rotor gear assembly 101 is disposed within each tilt rotor assembly 17a and 17b (see FIGS. 1A and 1B). Prop-rotor gear assemblies 101 drive rotor hubs 19a and 19b. Prop-rotor gear assembly 101 is adapted to be coupled to striker assembly 31, preferably by the inclusion of lugs 103 disposed on a coupling portion 104. Lugs 103 are aligned with and releasably received by mounting means 36 of base member 33. A shear boss 105 is coupled to base member 33 to provide additional support against shear forces acting between striker assembly 31 and prop-rotor gear assembly 101. A scrim 107, preferably an epoxy scrim, is bonded to base member 33 to provide fretting protection. A solid shim 109, preferably made of a metallic material, is disposed between scrim 107 of base member 33 and coupling portion 104 of prop-rotor gear assembly 101 to provide adjustment capability.

Figure 5:
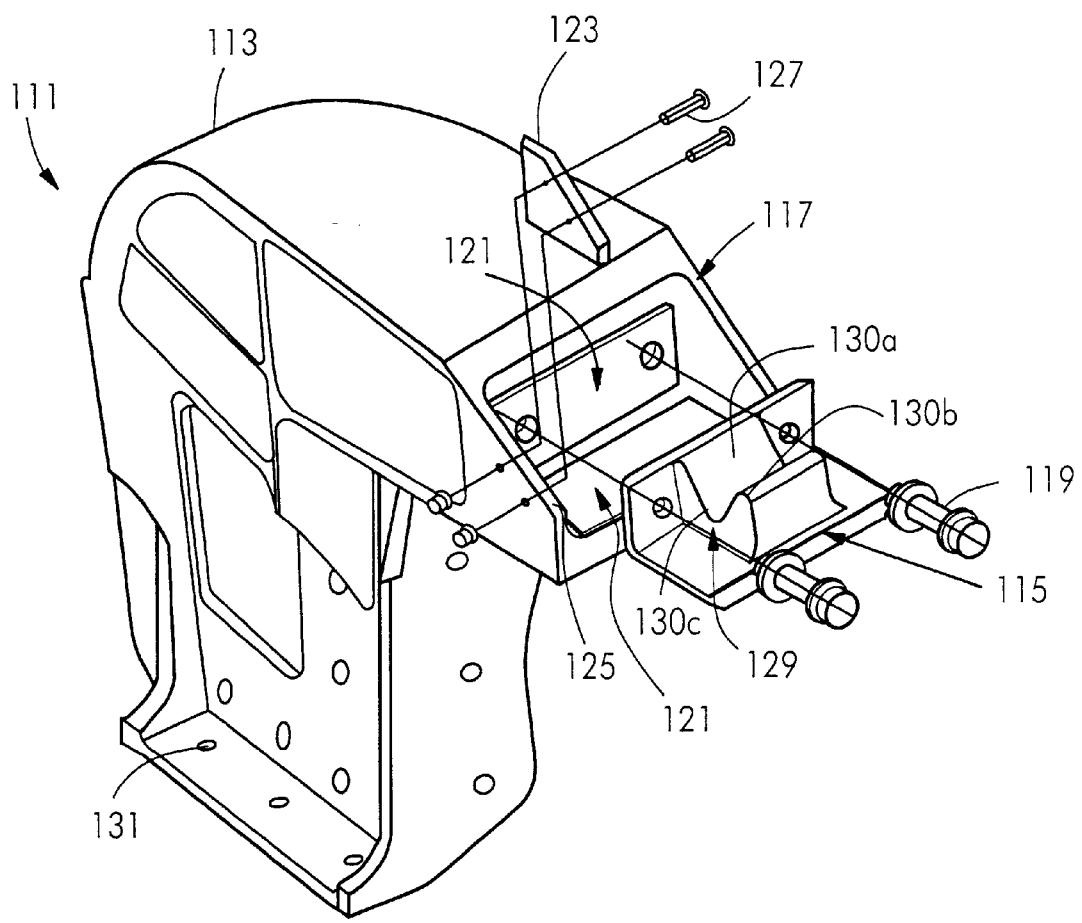
FIG. 5 is an exploded perspective view of a cradle assembly of the tilt rotor downstop assembly according to the present invention.

Referring now to FIG. 5 in the drawings, an exploded perspective view of a cradle assembly 111 of the low-height tunable downstop assembly according to the present invention is illustrated. Cradle assembly 111 includes an attachment portion 113 and yaw restraint portion, or V-block 115. Attachment portion 113 is preferably made of a rigid metallic material, such as aluminum. V-block 115 is carried in a trough portion 117 of attachment portion 113. V-block 115 is adjustably coupled to attachment portion 113 by fasteners, preferably bolts 119. Trough portion 117 is preferably lined with at least one shim 121. Shims 121 are preferably aluminum peel shims which allow vertical and lateral adjustment of placement of V-block 115. A spacer plate 123 is disposed on a forward internal face 125 of trough portion 117 to allow for forward-aft adjustment of placement of V-block 115. Spacer plate 123 is only necessary on forward internal face 125 because tilt rotor assemblies 17a and 17b exert forces upon V-block 115 in the forward direction. Spacer plate 123 preferably includes an epoxy coating. Spacer plate 123 is coupled to trough portion 117 by conventional fastening means 127, such as bolts or rivets.

V-block 115 is made of a rigid metallic material, such as aluminum. V-block 115 has a rounded V-shaped striker interface portion 129 configured to releasably receive tip portion 49 of post portion 37 as tip portion 49 rotates downward with each tilt rotor assembly 17a and 17b. Striker interface portion 129 includes inclined surfaces 130a and 130b that converge to form a generally longitudinal trough 130c. Trough 130c is generally transverse to the lateral loads, or yaw loads, shown in FIG. 2B. Because striker interface portion 129 is subjected to oscillatory vibration loads from tip portion 49, it is desirable that striker interface portion 129 have a very hard surface to resist fatigue failure. Thus, it is preferable that V-block 115 be made of a hard metallic material, and that at least striker interface portion 129 be coated with a very hard material, such as tungsten carbide. To ensure that V-block 115 does not move relative to attachment portion, it is preferred that V-block 115 be coated with an adhesive material, such as epoxy, on all surfaces that are in contact with shims 121. Attachment portion 113 includes mounting apertures 131.

It is preferred that tip portion 49 be forced against yaw restraining V-block 115 at a selected preload, even in the presence of dynamic loads, while tilt rotor aircraft 11 is in the airplane mode. In this manner, the selected preload is transferred from cradle assembly 111 to wing 15a. As long as the selected preload is maintained, tilt rotor aircraft 11 will remain stable in the aircraft mode. If the selected preload is not maintained, tilt rotor aircraft will become unstable due to the oscillatory loads. The present invention provides a means of sensing, controlling, and maintaining the selected preload between tilt rotor assemblies 17a and 17b and wings 15a and 15b, even in the presence of dynamic flight loads.

Figure 6:
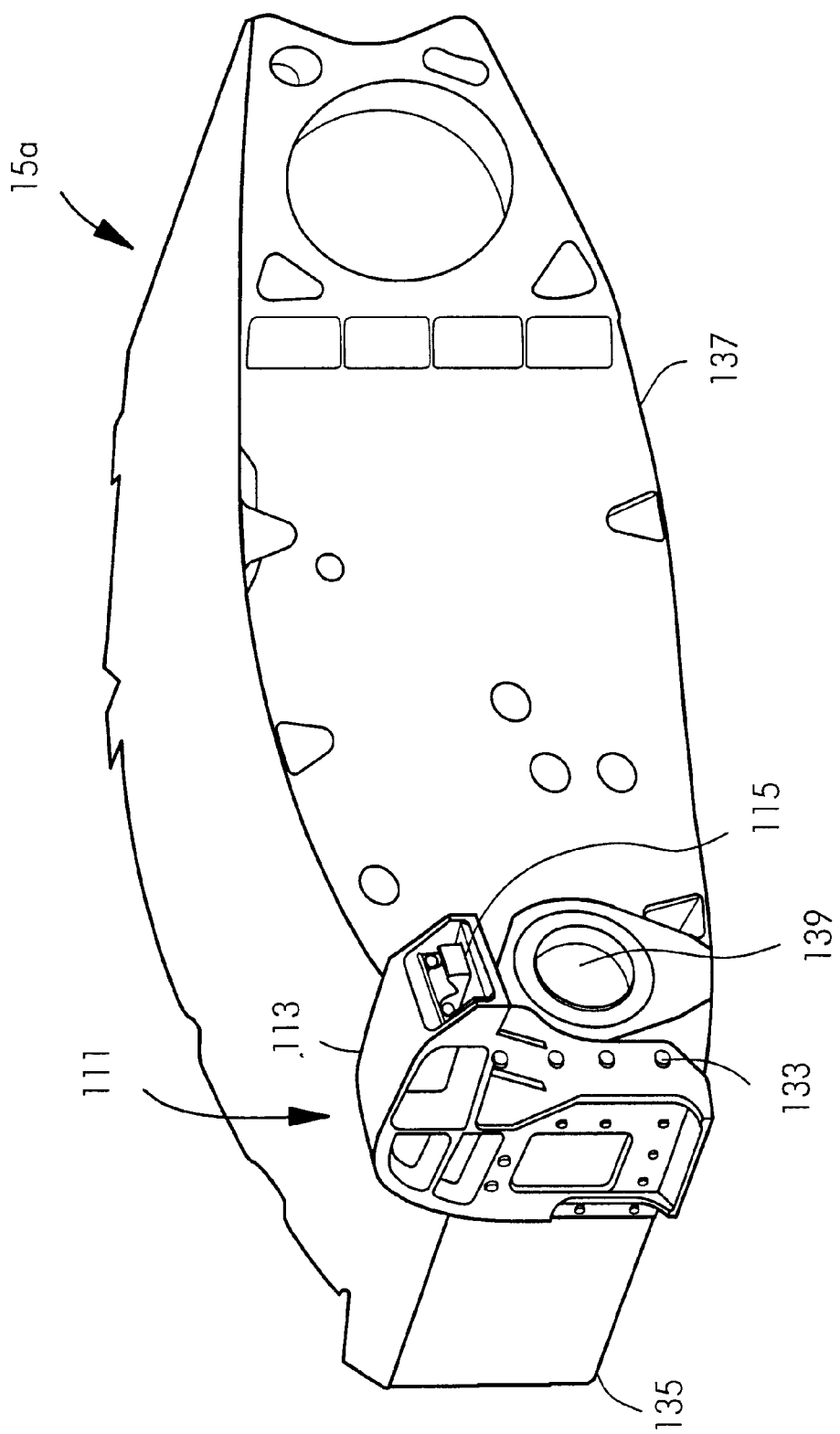
FIG. 6 is a perspective view illustrating the attachment of the cradle assembly of FIG. 5 to an outboard wing rib and a forward wing spar.

Referring now to FIG. 6 in the drawings, cradle assembly 111 is illustrated coupled to wing 15b. Attachment portion 113 of cradle assembly 111 is adapted to be coupled to at least one wing spar and at least one wing rib. Cradle assembly 111 does not intrude into the interior of wing 15b. Preferably, attachment portion 113 is coupled to a forward wing spar 135 and an outboard wing rib 137 by conventional fastening means 133, such as bolts or rivets, through mounting apertures 131. As is shown, trough portion 117 may extend outboard in a cantilevered fashion beyond outboard wing rib 137 to ensure that the low-height feature of the present invention is maintained and to allow for selected preload induced strain as will be explained in more detail below. Attachment portion 113 is configured to allow attachment of cradle assembly 111 to wings 15a and 15b, while not interfering with other components of wing 15b, such as aperture 139 through which a conversion actuator spindle 143 (see FIG. 7) passes.

In operation, tilt rotor assemblies 17a and 17b are rotated downward from the helicopter mode (see FIG. 1B) to the airplane mode (see FIG. 1A). Because striker assembly 31 is coupled to prop-rotor gear assembly 101 via coupling portion 104, as tilt rotor assemblies 17a and 17b reach the airplane mode, tip portions 49 of post portion 37 of striker arm 35 are forced into contact with V-blocks 115. It is desirable that tilt rotor assemblies 17a and 17b receive a selected downward preload from conversion actuator 141 (see FIG. 7) such that tip portions 49 remain in contact with V-block 115. As long as the selected preload is maintained, tip portion 49 will not move relative to V-block 115, and the yaw loads, or lateral loads, will be effectively restrained. In the preferred embodiment of the present invention, V-block 115 does not latch onto or lock onto tip portion 49. It should be understood that latching or locking mechanisms may be desirable in certain situations or installations. As is shown, cradle assembly 111 wraps around forward wing spar 135 and outboard wing rib 137. This allows cradle assembly 111 to maintain a low-height.

Figure 7:
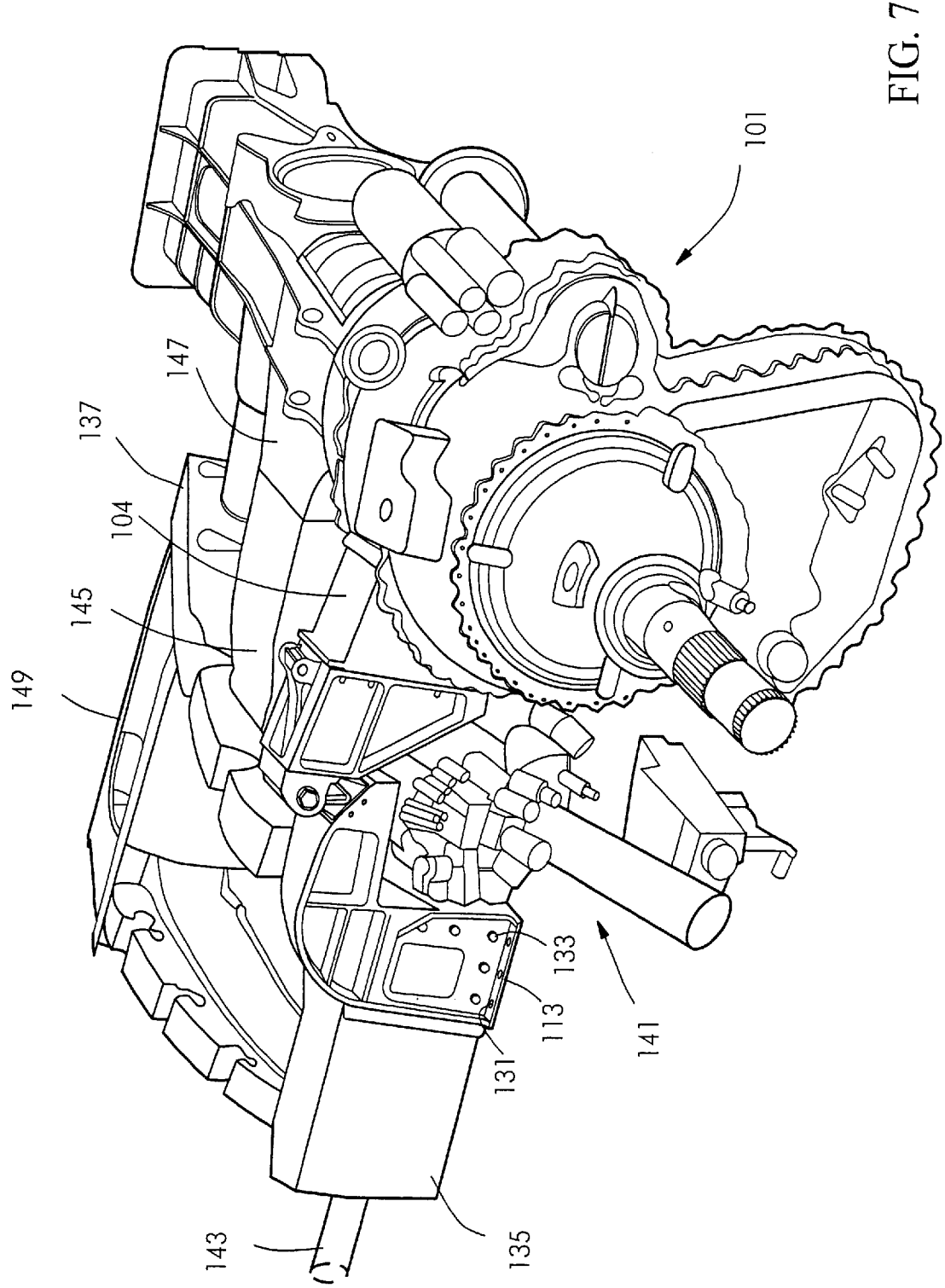
FIG. 7 is a perspective view of the assembled tilt rotor downstop assembly according to the present invention, including the striker assembly of FIGS. 2A and 2B and the cradle assembly of FIGS. 5 and 6.

Referring now to FIG. 7 in the drawings, the components of FIGS. 2A–6 are illustrated in an assembled fashion. Conventional hydraulic conversion actuators 141 are used to convert tilt rotor assemblies 17a and 17b between the airplane mode and the helicopter mode. Conversion actuators 141 pivot about spindles 143 as conversion actuators 141 actuate tilt rotor assemblies 17a and 17b by exerting forces on pylons 145. Tilt rotor assemblies 17a and 17b pivot about spindles 147 that pass through rear portions 149 of wings 15a and 15b. It should be apparent that cradle assembly 111 may be coupled to coupling portion 104 of prop-rotor gear assembly 101, and striker assembly 31 may be coupled to wings 15a and 15b without affecting the functionality, tunability, or low-height feature of the present invention.

Figure 8A:
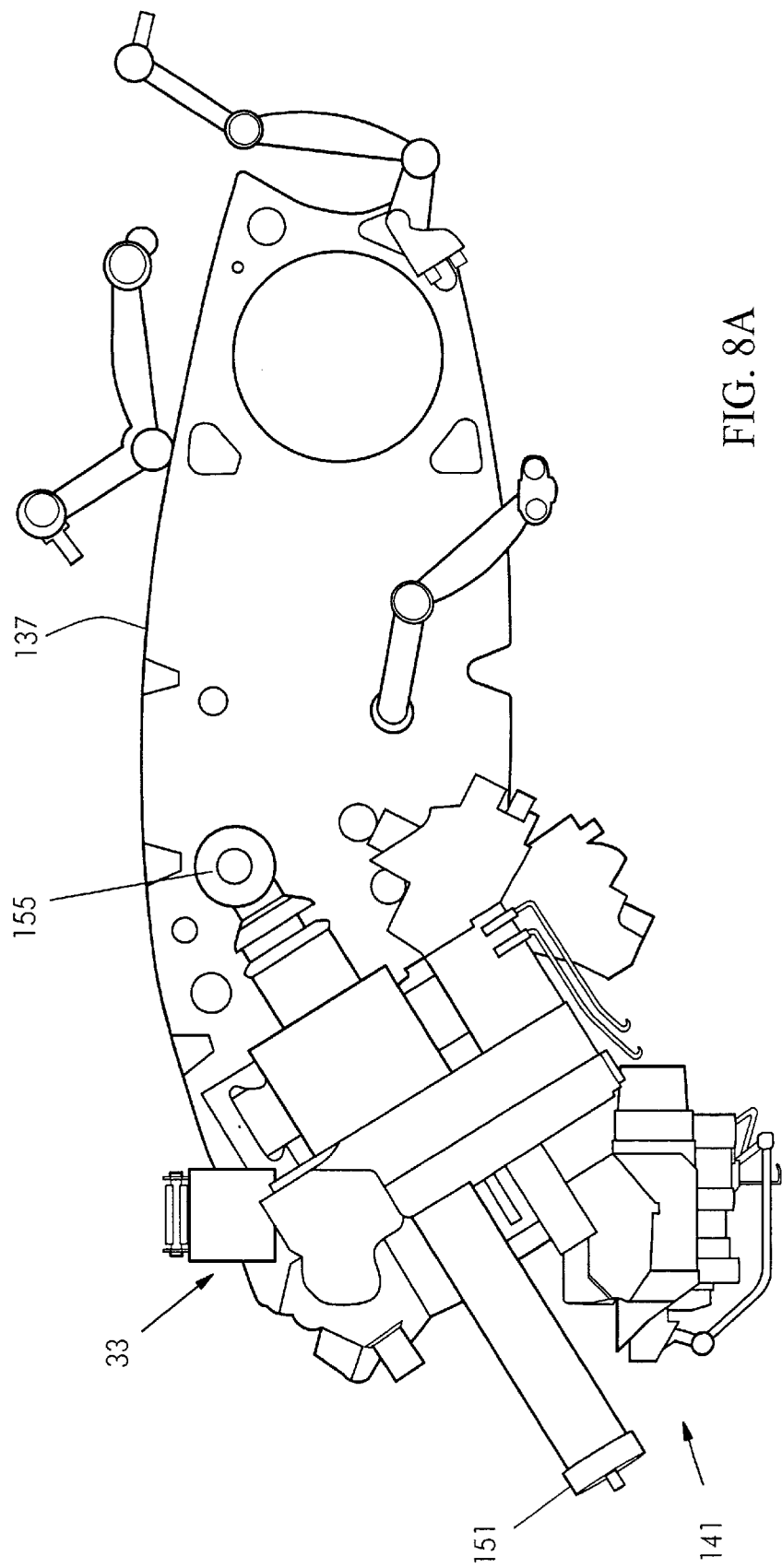
FIG. 8A is an end view of the tilt rotor wing tip of FIG. 6 including a conversion actuator in the airplane mode.
Figure 8B:
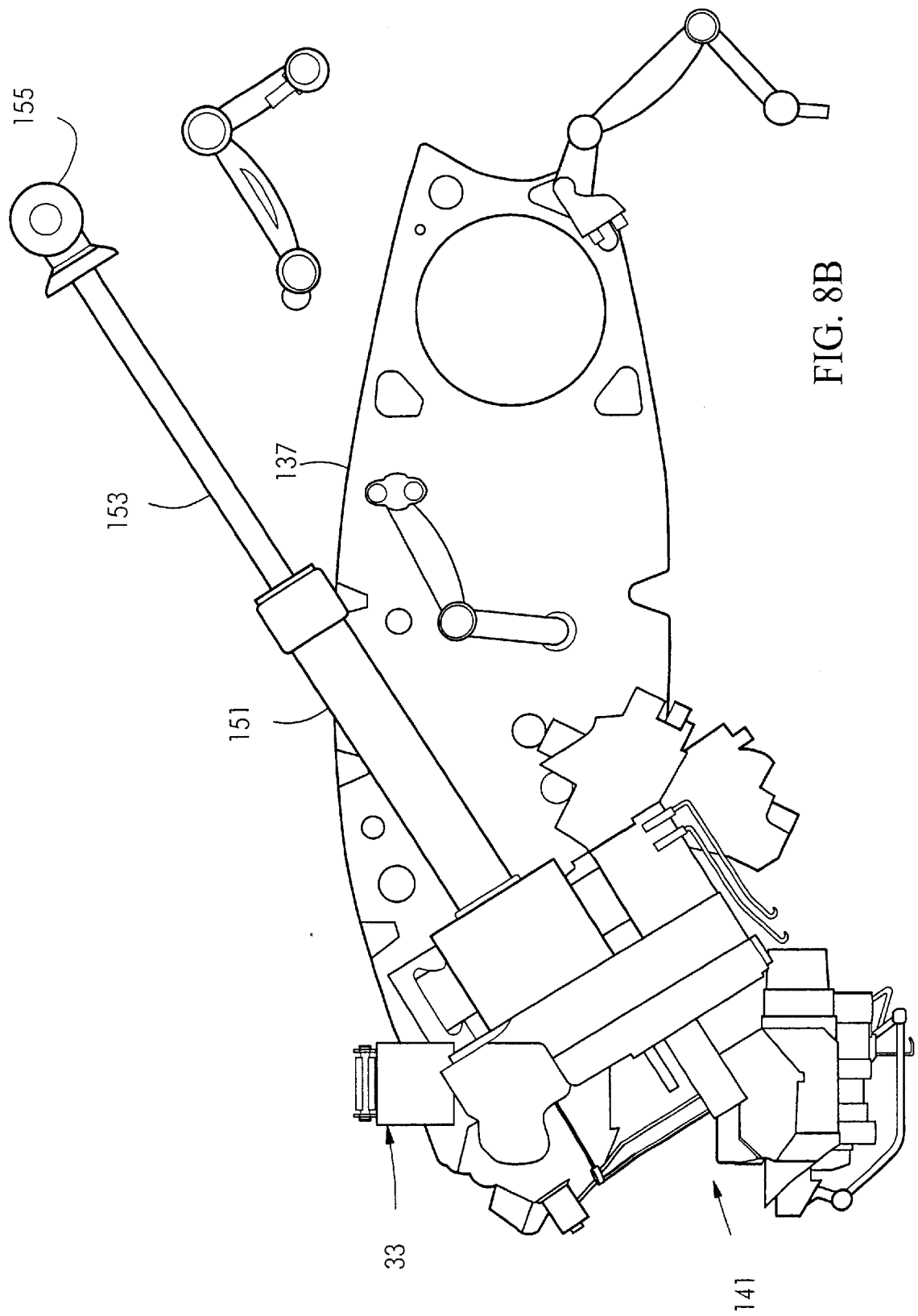
FIG. 8B is an end view of the tilt rotor wing tip of FIG. 6 including a conversion actuator in the helicopter mode.

Referring now to FIGS. 8A and 8B in the drawings, conversion actuator 141 is shown in both the airplane mode (FIG. 8A) and the helicopter mode (FIG. 8B). Conversion actuator 141 is preferably a ball screw type actuator having a retractable cylinder 151 and an extendable shaft 153 that carries a connection lug 155 for coupling to pylons 145. Conversion actuator 141 forces tilt rotor assembly 17a against wing 15a, and provides the selected preload between tilt rotor assembly 17a and wing 15a. The amount of force and preload vary according to the application. For tilt rotor aircraft 11, the preferred values of the force and the selected preload, as well as the preferred tolerances, are dependent upon several factors, such as cost, weight, and complexity. Nevertheless, the tolerances achieved by conversion actuator 141 are a considerable improvement over the prior-art methods of preloading. This is because the preload is not allowed to be unnecessarily high, which requires additional structural support, and consequently, additional cost and weight.

Figure 9:
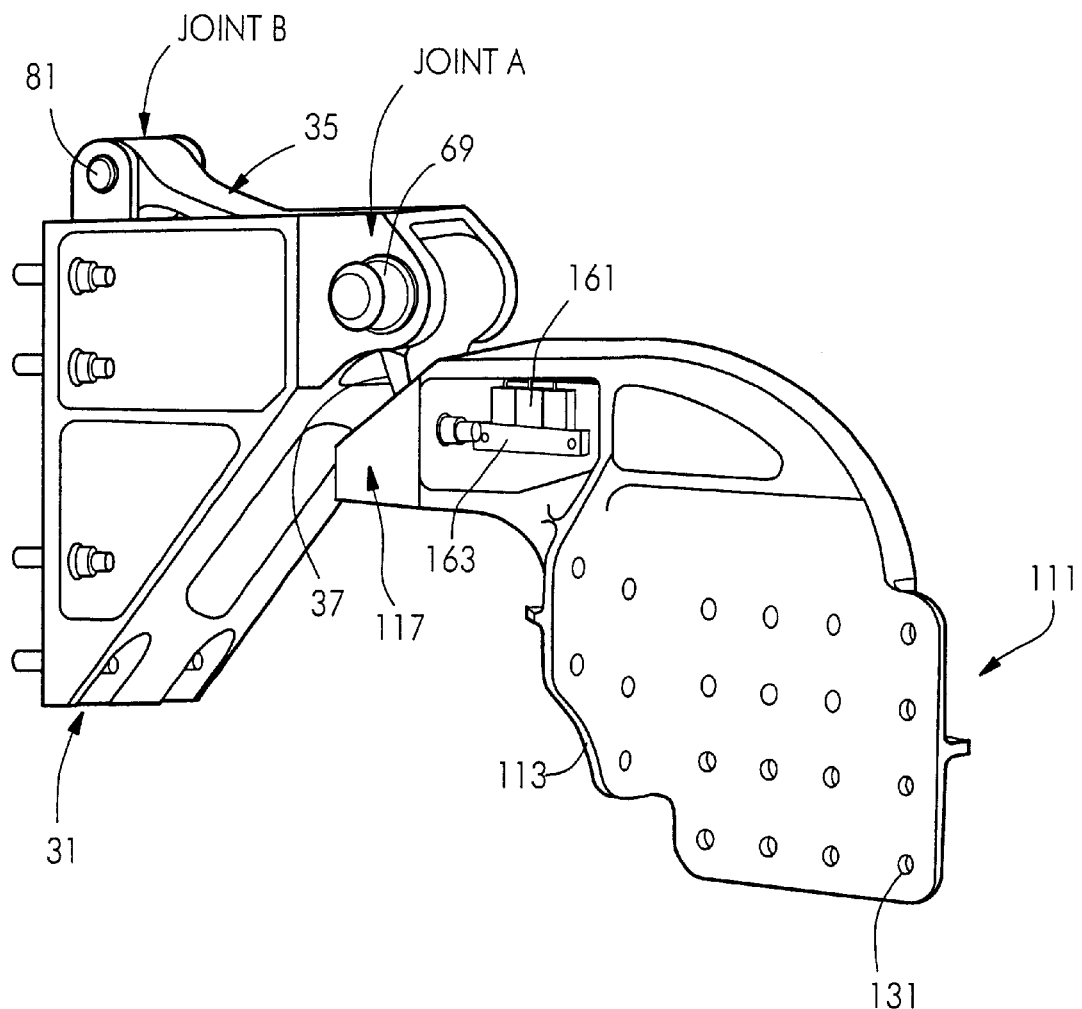
FIG. 9 is a perspective view of the tilt rotor downstop assembly of the present invention including sensor modules.

Referring now to FIG. 9 in the drawings, striker assembly 31 and cradle assembly 111 are shown forced together, i.e., in the airplane mode. Conversion actuator 141 supplies a downward preload on cradle assembly 111. Due to the downstop load, cantilevered trough portion 117 of cradle assembly 111 is deflected in a generally downward direction, resulting in the existence of bending moments and shear forces in cradle assembly 111. As a result, bending and shear induced strains, proportional to the downstop load, are induced in cradle assembly 111. These strains, preferably the shear induced strains, are sensed directly by a plurality of sensor modules 161, preferably three, that are bonded to cradle assembly 111. Sensor modules 161 are aligned in a generally parallel fashion to provide redundant downstop load readings. Each sensor module 161 is installed with and remains coupled to an indexing and locating bracket 163. Indexing and locating bracket 163 ensures that sensor modules 161 are installed and aligned properly. Each sensor module 161 is electrically coupled to a separate conventional flight control computer (not shown).

Figure 10A:
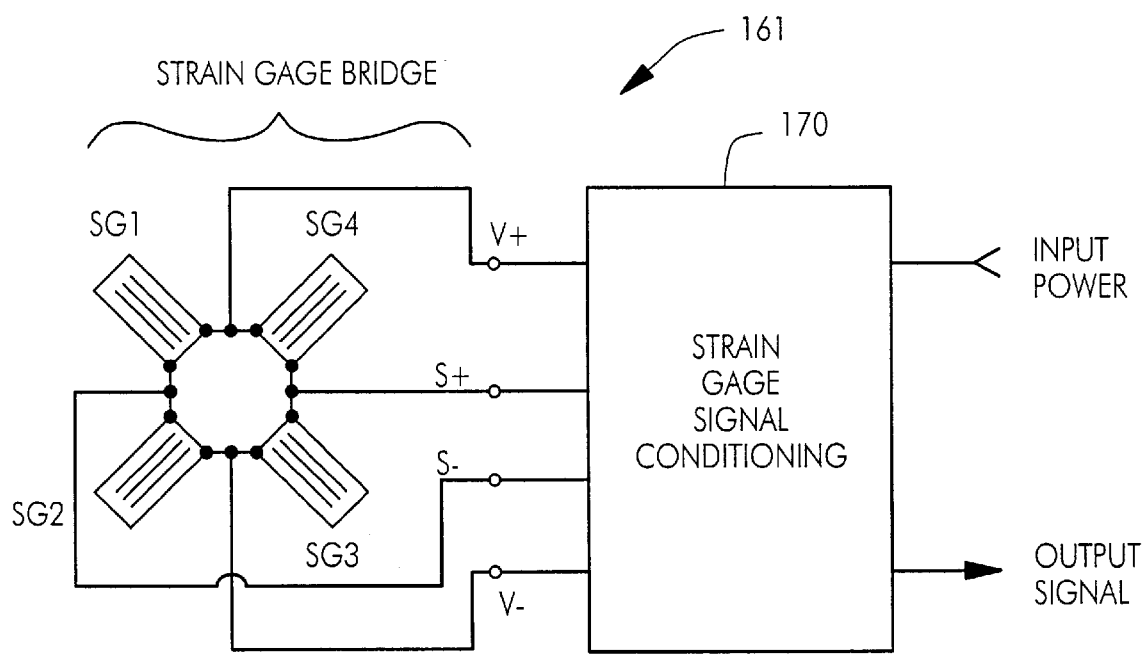
FIG. 10A is a schematic of a sensor module of FIG. 9.

Referring now to FIG. 10A in the drawings, sensor module 161 is schematically illustrated. Each sensor module 161 includes a plurality of strain gages, preferably four, SG1, SG2, SG3, and SG4; and associated strain gage signal conditioning circuitry 170, preferably installed within the same enclosure. As is shown, four strain gages SG1, SG2, SG3, and SG4 are connected in a bridge circuit. As necessary, conventional resistors (see FIG. 10B) may be required to complete the bridge and adjust for offset and sensitivity. Strain gages SG1, SG2, SG3, and SG4 are physically arranged and electrically connected to respond to downstop load induced strains, preferably shear strains, in cradle assembly 111. The physical and electrical arrangement is also designed to cancel all strains in cradle assembly 111 except those induced by the downstop load.

Figure 10B:
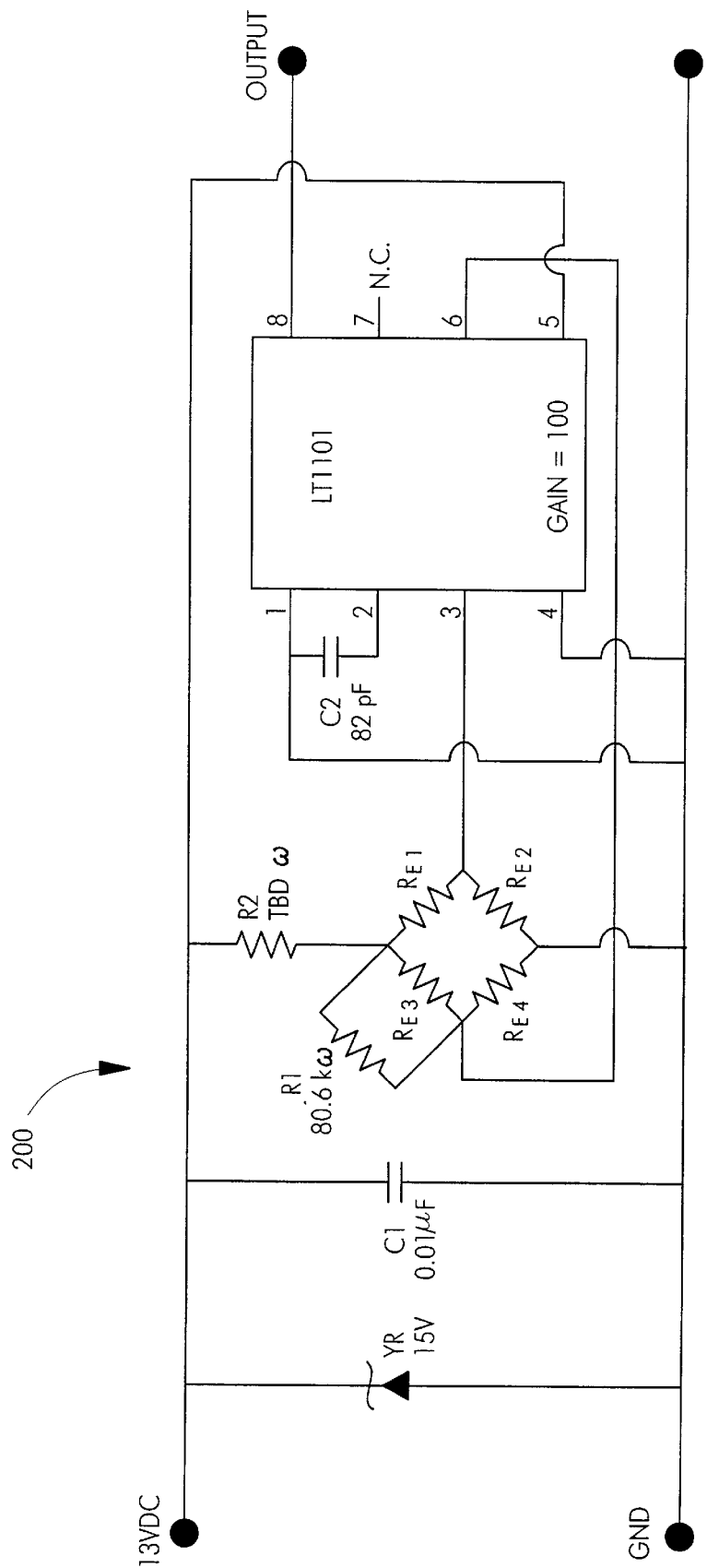
FIG. 10B is a sample strain gage signal conditioning circuit according to the present invention.

Referring now to FIG. 10B in the drawings, a sample strain gage signal conditioning electrical circuit 200 according to the present invention is illustrated. The strain gage bridge within each sensor module 161 is electrically coupled to a strain gage signal conditioning circuit 200 which is then coupled to a flight control computer. Strain gage signal conditioning circuit 200 receives an electrical input signal, preferably a differential DC voltage, from the associated strain gage bridge within sensor module 161. The input signal is conditioned, processed, and amplified by strain gage signal conditioning circuit 200. An electrical output signal, preferably a DC voltage, is sent to an associated flight control computer.

In operation, as trough portion 117 is deflected, the downstop load induced strain is sensed directly by sensor modules 161. The preload induced strain causes each sensor module 161 to generate signals proportional to downstop preload. The signals from sensor modules 161 are sent to the associated flight control computer where they are processed and compared. From the plurality of preload measurements, a single preload value, preferably an average, is obtained. This average preload measurement is then processed and compared to a pre-determined acceptable range. The pre-determined acceptable range is selected to ensure adequate preload between tilt rotor assembly 17a and wing 15a to maintain aircraft stability, yet avoid overloading of any part of the structure. In this manner, sensor modules 161 and the strain gages are used to directly measure a combined static and dynamic load variable in tilt rotor aircraft 11.

If a sensor module 161 sends an erroneous signal, the flight control computers are programmed to ignore that signal. For example, if a sensor module 161 indicates a significant strain in cradle assembly 111 while tilt rotor aircraft 11 is in helicopter mode, the signals from that sensor module 161 would be ignored, and not considered. If the signals from a sensor module 161 indicate that the load between striker assembly 31 and cradle assembly 111 is below a pre-determined value required to maintain aircraft stability, then the flight control computers send a warning signal to the pilot and an appropriate signal to conversion actuator 141 to increase the force exerted by striker assembly 31 on cradle assembly 111. Likewise, if the signals from sensor modules 161 indicate that the preload between striker assembly 31 and cradle assembly 111 is above a pre-determined value necessary to maintain aircraft stability, then the flight control computers send a warning signal to the pilot and an appropriate signal to conversion actuator 141 to decrease the force exerted by striker assembly 31 on cradle assembly 111. Thus, the present invention provides a closed loop control system for sensing, maintaining, and controlling the preload between tilt rotor assembly 17a and wing 15a by using a plurality of redundant sensor modules 161 coupled to flight control computers.

It should be apparent from the foregoing that an invention having significant advantages has been provided. Providing an L-shaped striker assembly with a short generally vertical post portion and a longer generally horizontal leg portion that can be selectively tuned by merely altering the thickness, allows the present invention to absorb or dampen oscillatory vibration loads without intrusion into the wings, while maintaining a low-height. Using strain gages to directly measure the preload induced strain of a downstop assembly provides a means of sensing, maintaining, and controlling the preload between a tilt rotor assembly and a wing in the airplane mode, thereby ensuring that aircraft stability is maintained.

While the present invention has been described with reference to sensing the preload between a tilt rotor assembly and a wing, it should be understood that the present invention may be used in any application that involves sensing, maintaining, and controlling a selected preload between two massive components movable relative to each other. Examples of other applications include: aircraft with retractable wing members; aircraft with other retractable components, such as radar assemblies; water vessels with similar retractable components; and large telescopes. While the invention is shown in a limited number of forms, it is not limited to just these forms, but is susceptible to various changes and modifications without departing from the spirit thereof.

We claim:

1. An apparatus for maintaining a selected preload between members movable relative to one another, the apparatus comprising:

at least one actuator for creating a force between the members such that at least one of the members is strained, the force generating the selected preload between the members;

at least one sensor module coupled to at least one of the members to sense the strain therein and generate a corresponding signal; and at least one microprocessor coupled to the at least one strain gage to interpret the signal;

wherein the microprocessor processes the signal and sends a control signal to the at least one actuator causing the at least one actuator to increase the force if the force is less than the selected preload, or decrease the force if the force is greater than the selected preload.

2. The apparatus according to claim 1, wherein the at least one sensor module is a plurality of sensor modules aligned in a parallel arrangement, each sensor module comprising a plurality of strain gages.

3. The apparatus according to claim 1, wherein the members movable relative to one another comprise:

an airframe of an aircraft; and a wing member.

4. The apparatus according to claim 1, wherein the members movable relative to one another comprise:

an airframe of an aircraft; and a radar assembly.

5. The apparatus according to claim 1, wherein the members movable relative to one another comprise:

a watercraft; and a sensor assembly.

6. The apparatus according to claim 1, wherein the members movable relative to one another comprise:

an airframe of a tilt rotor aircraft; and a tilt rotor assembly.

7. An improved tilt rotor aircraft comprising:

an airframe;

at least one wing member coupled to the airframe;

a tilt rotor assembly pivotally coupled to the at least one wing member;

a downstop assembly disposed between the tilt rotor assembly and the at least one wing member;

at least one actuator for pivoting the tilt rotor assembly relative to the at least one wing member and for creating a force between the tilt rotor assembly and the at least one wing member such that the downstop assembly is strained and a selected preload is induced between the tilt rotor assembly and the at least one wing member;

at least one sensor module coupled to the downstop assembly to sense the strain therein and generate a corresponding signal; and at least one microprocessor coupled to the at least one sensor module to interpret the signal;

wherein the microprocessor processes the signal and sends a control signal to the at least one actuator causing the at least one actuator to increase the force if the force is less than the selected preload or decrease the force if the force is greater than the selected preload.

8. The apparatus according to claim 7, wherein the force is increased and decreased by dynamic loads generated during flight.

9. The apparatus according to claim 7, wherein the at least one sensor module is a plurality of redundant sensor modules aligned in a parallel arrangement, each sensor module comprising a plurality of strain gages.

10. The apparatus according to claim 7, wherein the downstop assembly comprises:

a first portion coupled to the tilt rotor assembly; and a second portion coupled to the at least one wing member, the second portion being configured to releasably receive the first portion.

11. The apparatus according to claim 10, wherein the at least one sensor module is coupled to the second portion.

12. The apparatus according to claim 10, wherein the second portion comprises:

a cantilevered portion adapted to receive the at least one sensor module; and a V-shaped block carried by the cantilevered portion, the V-shaped block being adapted to releasably receive the first portion;

wherein the cantilevered portion is strained by the force.

13. The apparatus according to claim 7, wherein the downstop assembly isolates and absorbs oscillatory loads generated by the tilt rotor assembly.

14. The apparatus according to claim 13, wherein the oscillatory loads are pitch loads and yaw loads.

15. The apparatus according to claim 7, wherein the pitch loads are isolated and absorbed by the first portion and the yaw loads are isolated and absorbed by the V-block.

16. In a tilt rotor aircraft having an airframe, at least one wing member coupled to the airframe, and a tilt rotor assembly pivotally coupled to the at least one wing member, a method of maintaining a selected preload between the tilt rotor assembly and the at least wing member comprising the steps of:

providing at least one actuator for pivoting the tilt rotor assembly relative to the at least one wing member;

disposing a downstop assembly between the tilt rotor assembly and the at least one wing member;

coupling at least one sensor module to the downstop assembly;

electrically coupling at least one microprocessor to the at least one sensor module;

pivoting the tilt rotor assembly relative to the at least one wing member with the actuator;

creating a force between the tilt rotor assembly and the at least one wing member;

straining the downstop assembly with the force;

sensing the strain in the downstop assembly with the at least one sensor module and generating a corresponding signal;

interpreting the signal with the microprocessor;

sending a control signal from the microprocessor to the at least one actuator in response to the signal;

increasing the force with the actuator if the force is less than the selected preload; and decreasing the force with the actuator if the force is greater than the selected preload.

17. The method according to claim 16, wherein the force is increased and decreased by dynamic loads generated during flight.

18. The method according to claim 16, wherein the step of coupling at least one sensor module to the downstop assembly is achieved by coupling a plurality of redundant sensor modules to the downstop assembly in a parallel arrangement, each sensor module comprising a plurality of strain gages.

19. The method according to claim 16, wherein the step of disposing a downstop assembly between the tilt rotor assembly and the at least one wing member is achieved by disposing a first portion on the tilt rotor assembly and disposing a second portion on the at least one wing member.

* * * * *